United States Patent
Wu et al.

(10) Patent No.: US 11,573,875 B2
(45) Date of Patent: Feb. 7, 2023

(54) PRODUCT EVALUATION USING TRANSACTION DETAILS FROM A PRODUCTION SYSTEM

(71) Applicant: PayPal, Inc., San Jose, CA (US)

(72) Inventors: Yuehao Wu, Cupertino, CA (US); Xiaohan Yun, Palo Alto, CA (US); Adrian Oliver Suciu, San Jose, CA (US); Yunfeng Li, Golden, CO (US); Quin Zuo, Cupertino, CA (US)

(73) Assignee: PayPal, Inc., San Jose, CA (US)

( * ) Notice: Subject to any disclaimer, the term of this patent is extended or adjusted under 35 U.S.C. 154(b) by 859 days.

(21) Appl. No.: 16/457,700

(22) Filed: Jun. 28, 2019

(65) Prior Publication Data

US 2020/0409812 A1 Dec. 31, 2020

(51) Int. Cl.
*G06F 11/00* (2006.01)
*G06F 11/30* (2006.01)
*G06F 11/36* (2006.01)
*G06Q 20/10* (2012.01)

(52) U.S. Cl.
CPC ...... *G06F 11/3013* (2013.01); *G06F 11/3664* (2013.01); *G06F 11/3692* (2013.01); *G06Q 20/10* (2013.01)

(58) Field of Classification Search
CPC ............ G06F 11/3688; G06F 11/3664; G06F 11/3684; G06F 11/3692; G06F 11/3476; G06F 11/3457
See application file for complete search history.

(56) References Cited

U.S. PATENT DOCUMENTS

| 7,676,569 | B2 | 3/2010 | Barnett et al. |
| 8,291,473 | B2 | 10/2012 | Choudhury et al. |
| 8,694,626 | B2 | 4/2014 | Dugatkin et al. |
| 2015/0205712 | A1 | 7/2015 | Michelsen |
| 2018/0089071 | A1* | 3/2018 | Keskitalo ............ G06F 11/3672 |
| 2018/0102957 | A1* | 4/2018 | Smith .................... H04L 43/50 |
| 2020/0089820 | A1* | 3/2020 | Luo .................... G01R 31/2894 |

* cited by examiner

*Primary Examiner* — Charles Ehne
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to accessing, by an evaluation computer system, transaction details from a subset of current transactions being processed by a production version of a transaction processing service that is implemented on a production computer system. The evaluation computer system may perform, in real-time, tests on a particular product using the transaction details. The evaluation computer system may then store output from the tests that are performed using the transaction details.

20 Claims, 9 Drawing Sheets

*700*

Start
*701*

Detecting, by the evaluation computer system, an initiation of a particular transaction.
*710*

Generating, by the evaluation computer system, a value associated with the particular transaction using an ID of the transaction and a time stamp.
*720*

Adding, by the evaluation computer system, the particular transaction to the subset of current transactions in response to determining that the generated value satisfies a particular threshold.
*730*

Extracting, by the evaluation computer system using a transaction service interface, the transaction details from the particular transaction by copying messages generated during the processing of the particular transaction.
*740*

Using, by the evaluation computer system, the transaction details for the particular transaction as test input data for the particular product.
*750*

End
*790*

*FIG. 7*

PRODUCT EVALUATION USING TRANSACTION DETAILS FROM A PRODUCTION SYSTEM

BACKGROUND

Technical Field

This disclosure relates generally to computer system evaluation, and more particularly to computer system evaluations using transaction details from a production system.

Description of the Related Art

Online services, such as email servers, cloud computing, online shopping, data management, banking and investment services, etc., provide various computing resources and services to end users. Many online services are in continuous operation. Operators of these services may desire to introduce new hardware or software products to the online service for various reasons such as to fix bugs, add new features, replace obsolete or problematic systems, improve efficiency and/or capacity of the service, and the like. Before a new hardware or software product is added to a production online service, the new product may be evaluated to assess whether or not the new product meets operational performance targets, for example, fixing targeted bugs, or increasing performance by a desired amount.

BRIEF DESCRIPTION OF THE DRAWINGS

FIG. 7 is a flow diagram illustrating an embodiment of a method for selecting and using a particular transaction for evaluation of a new product.

DETAILED DESCRIPTION

Figure 1:
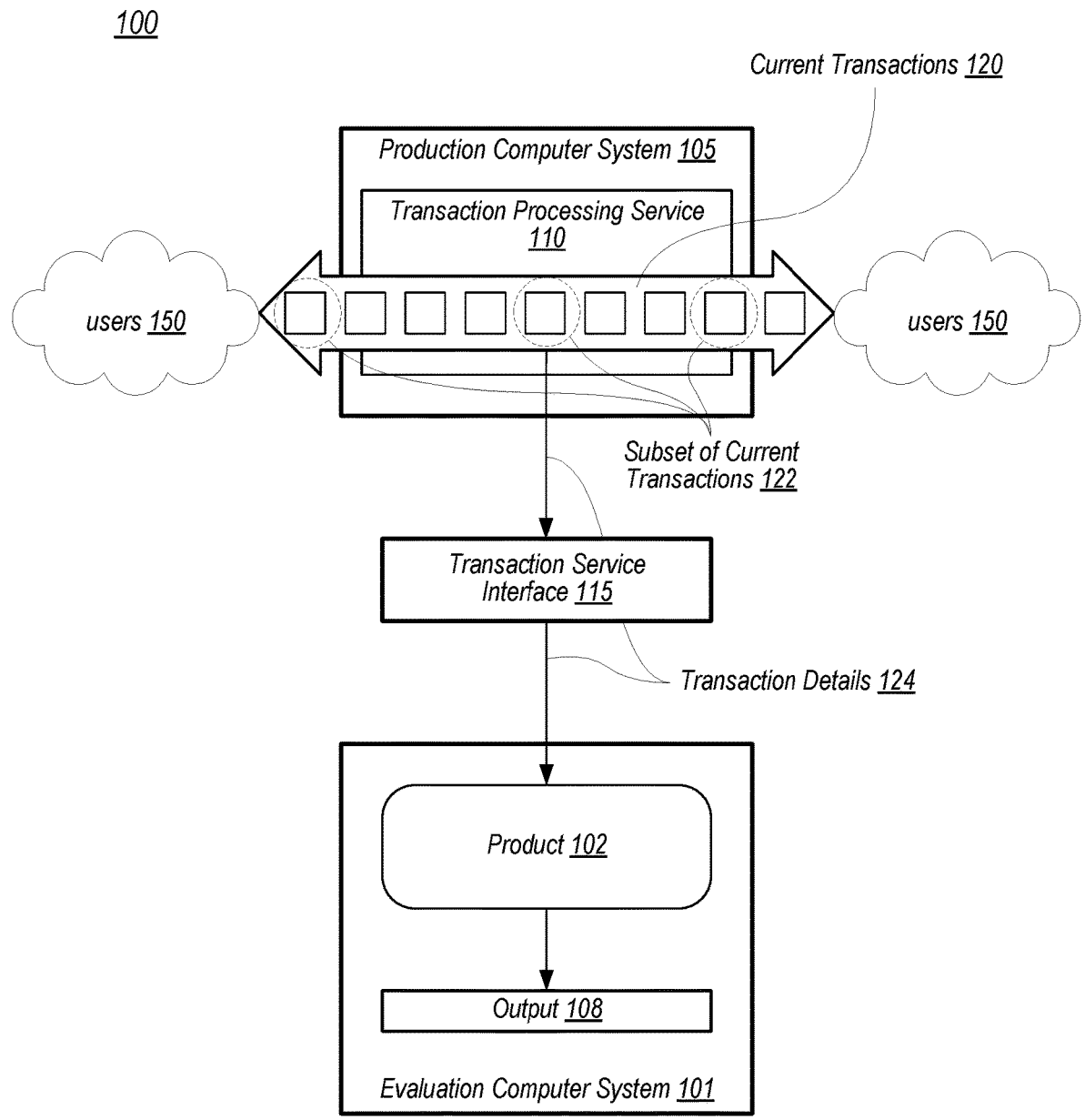
FIG. 1 illustrates a block diagram of an embodiment of an online service that includes an online production computer system and an evaluation computer system.

Evaluation of a new resource may include simulating or modeling a production environment in which the new product can operate in conditions that are similar to a production environment. The more closely a production environment may be simulated, the more accurately the new product may be evaluated. An accurate simulation environment, however, may require a large number of resources in order to generate realistic test input. For example, a particular online service may handle millions of transactions in a minute, or even in a second. Even if the new product is expected to process just a portion of these transactions, the simulation system may still be expected to generate a vast number of test transactions for the new product to process. Generation and storage of such test transactions may consume a large number of computing and personnel resources.

Evaluation of a new product is performed before adding the new product to a production computer system. As used herein, a "production computer system" refers to the system that implements the online service at a given time. A production computer system typically includes a physical computer system on which software executes to implement the service. In some embodiments, the physical computer system may include multiple computers networked together to share processing tasks, such as by a data center. Furthermore, the production computer system may be implemented as a "virtual machine," an operating system hosted by a computer system to emulate operation of a physical computer system.

In contrast to a production computer system, an "evaluation computer system" refers to a computer system on which a product may be tested before being used (for example, in the context of the online service). In a similar manner as the production computer system, the evaluation computer system may be implemented in any suitable manner, such as a single computer hardware system hosting a single operating system, or across a multiple computer data center hosting a plurality of virtual machines utilizing a variety of operating systems. In some embodiments, the production computer system and the evaluation computer system may be implemented as separate virtual machines hosted on a same computer system or data center.

A "product" being tested by an evaluation computer system may be any hardware or software computer resource, such as a new server system, a new version of the online service, or a new software component of the service. Although a product may not be directly offered for sale, the product may be utilized to implement the online service. For example, the product may be a new module for assessing a risk level associated with an initiating user or a receiving user of a transaction. As another example, the product may be a further submodule used to determine a particular type of risk associated with a particular type of user.

Addition of a new or updated product to a production online service may be restricted until the new product has been evaluated and an operator of the online service is satisfied that the new product is unlikely to cause an interruption to the provided services. Sufficient evaluation of the new product may include performing a particular number of test transactions using the new product in a simulation environment. For an online service that performs a large number of transactions (e.g., thousands or millions of transactions per minute), the particular number of test transactions may be hundreds, thousands, or even millions. Maintaining a database with a large number of test transactions consumes computing resources to generate and store the multitude of test transactions. In addition, personnel resources may be utilized to keep the test transactions up-to-date and relevant to actual transactions being performed by current users of the online service.

It is noted that the term "evaluation" may vary in scope in different environments. As used herein, "evaluation" refers to a broad scope of testing phases that include test and debug operations used to develop a product that meets a particular set of specifications, and validation operations to verify that the developed product meets the particular specifications before being released for production use.

Techniques are desired in which a new product may be evaluated using test input data generated from details that are extracted from production transactions (i.e., actual, current transactions of the system). Using production transaction details may avoid the need for the evaluation system to generate or maintain a large number of test transactions. Using product transaction details also advantageously results in ensuring that test input data representing up-to-date activities performed by users of the online service, which may lead to more reliable test inputs to the product being tested by the evaluation computer system.

The present disclosure thus contemplates an evaluation computer system that accesses transaction details from a subset of current transactions being processed by a production version of an online service that is implemented on a production computer system. This evaluation computer system performs, in real-time, tests on a new product using test input data that is generated from the transaction details from the subset of current transactions.

An embodiment of a system for evaluating a new product using transaction details from a transaction processing service is shown in FIG. 1. System 100 may correspond to any suitable online service capable of processing transactions from a plurality of users. As illustrated, system 100 includes production computer system 105 that is configured to implement transaction processing service 110. Transaction processing service 110, in turn, is configured to process current transactions 120 involving two or more of users 150 transacting with one another. Furthermore, system 100 includes evaluation computer system 101 that is configured to evaluate products such as product 102 using transaction details 124, which are received from production computer system 105 via transaction service interface 115.

As illustrated, production computer system 105 is configured to process a plurality of current transactions 120 between two or more entities that use transaction processing service 110 that is implemented on production computer system 105. Current transactions 120 may be initiated by a particular one of users 150 and may involve another one or more of users 150. As used herein, a "transaction" broadly refers to any exchange of information between entities associated with a service. In some cases, these entities are both users of a particular service, such as transaction processing service 110. For example, a transaction may correspond to a purchase or transfer of a tangible or intangible item, a service, etc. Alternately, a transaction could correspond to messaging between two users. Transactions may include any suitable actions associated with an exchange of information or an item, for example, an exchange of messages, data, files, media, currency, goods, services, or a combination thereof. Transaction processing service 110 provides users with a platform for performing such transactions. In some embodiments, transaction processing service 110 may have a large number of users 150 and current transactions 120 may, therefore, include hundreds, thousands, or even millions of transactions being processed every minute.

In addition, the transactions may include a plurality of sub-actions that are each performed as part of processing a particular transaction. For example, to complete the particular transaction, each entity involved in the transaction may be required to login to their respective account on transaction processing service 110. Several sub-actions may include receiving a set of login credentials for each entity, validating each set of login credentials, determining if a secondary login requirement is to be used (e.g., two-way authentication), and the like. Some of these sub-actions may not include interaction with either of users 150, but instead involve interaction between two or more modules within transaction processing service 110, or between transaction processing service 110 and a third party, such as an external database managed by a different entity.

Each of current transactions 120 may take some amount of processing time to be completed, allowing for multiple transactions to be active at any particular point in time. Current transactions 120 includes transactions (and associated sub-actions) being processed during an evaluation of product 102 by evaluation computer system 101. In disclosed embodiments, evaluation computer systems are configured to receive and utilize "current" transactions, which simply means that transactions that are active while product 102 is under evaluation are accessed.

Production computer system 105 is also configured to access, while processing the plurality of current transactions 120, transaction details 124 from a subset of the plurality of current transactions 122. A portion of current transactions 120 are selected, thereby forming the subset of current transactions 122. The selection process may be carried out by production computer system 105, evaluation computer system 101, or transaction service interface 115. Once a particular one of current transactions 120 is selected and added to the subset of current transactions 122, production computer system 105 accesses transactions details 124 from the selected transactions and these details are sent to evaluation computer system 101.

Transaction details 124 may include any suitable data associated with each of the subset of current transactions 122 that may be used to create test input data for evaluating product 102. For example, if a particular transaction includes a given one of users 150 sending a data file to a different one of users 150, then processing of the particular transaction may include various steps, such as verifying that the given user 150 has a right to send the data file, verifying that the different user 150 has a right to receive the data file, determining if content of the data file meets acceptable standards of transaction processing service 110, and the like. To perform these steps, production computer system 105 may exchange details with either of the given user 150, the different user 150, a database local to production computer system 105, a database external to production computer system 105, and the like. Transaction details 124 may include some or all of these exchanged details for the particular transaction.

In some embodiments, transaction details 124 may include information associated with one or more sub-actions included in the transactions of the subset of current transactions 122. For example, evaluations performed by evaluation computer system 101 may be directed towards a sub-action for verifying that an initiating user has a right to send a data file involved in a transaction. Transaction details 124 may, in such a case, include information associated with transaction processing service interacting with internal modules and/or a third-party service to determine permissions assigned to the initiating user. Other actions associated with the subset of current transactions may be ignored, or may be utilized by a different product evaluation.

Evaluation computer system 101, as shown, is configured to receive transaction details 124 from the subset of current transactions 122. In some embodiments, to isolate product 102 from production computer system 105 during the evaluation tests, evaluation computer system 101 may communicate with production computer system 105 via transaction service interface 115. Transaction service interface 115 may include software and/or hardware that allows evaluation computer system 101 to request and receive transaction details 124 when performing evaluation tests on product 102. Transaction service interface 115 may further allow evaluation computer system 101 to monitor processing of the subset of current transactions 122 to determine metrics, such as processing times and results, associated with the production processing of the subset of current transactions 122. These metrics may be used to determine a relative performance of product 102 during the evaluation tests. In some embodiments, transaction service interface 115 may be a standalone system coupled to both production computer system 105 and evaluation computer system 101. In other embodiments, transaction service interface 115 may implemented within production computer system 105, within evaluation computer system 101, or a combination thereof.

Evaluation computer system 101 is also configured to, using transaction details 124, perform tests on product 102 that is under evaluation by evaluation computer system 101. After receiving transaction details 124, evaluation computer system 101 uses transaction details 124 to generate test input data for evaluation tests being performed on product 102. In some cases, transaction details 124 are sent to product 102 with little to no changes, allowing product 102 to process the subset of current transactions 122 in a simulated production environment. In other cases, some of transaction details 124 may be altered to adhere to limitations existing within a simulation environment generated by evaluation computer system 101. For example, some user identity information may be altered to anonymize the users 150 and instead direct user details to a database of testcase users within the simulation environment.

In order to keep the test input data current and to avoid having to store a significant amount of transaction data and results, transaction details 124 may be used as test input data in real-time. In some cases, transaction details may be utilized in "real-time," a term which, as used herein, refers to transaction details that have been extracted from transactions that have been accessed within the previous second. In various embodiments, different time thresholds may be established for use by evaluation computer systems—for example, transaction details utilized in less than 200 ms, 300 ms, 500 ms, 1 sec, 1.5 secs, 2 secs, or 3 secs old.

For example, in some embodiments, on average, ninety-five percent of the accessed transaction details may be utilized within one second from receipt from the production computer system. In other embodiments, the evaluation computer system may use accessed transaction details within three seconds of receipt from the production computer system in ninety-eight percent of cases. In various embodiments, the short time period for utilizing the accessed transaction details may be seconds or minutes. In some cases, a small portion, e.g., one to ten percent, of the accessed transaction details may not be used within the short time period, or may not be used at all, and instead discarded or archived for later use. In addition, use of real-time transaction details for generating test input data does not exclude evaluation computer system 101 from using particular stored test cases. For example, one or more test cases may be used to evaluate how product 102 performs in response to a particular set of test input data.

Evaluation computer system 101 monitors output 108 from the tests performed using the transaction details 124. Evaluation computer system 101 applies the test input data based on transaction details 124 to product 102, causing product 102 to simulate processing of at least some of the subset of current transactions 122. In some cases, product 102 may simulate processing of a sub-action common to the subset of current transactions 122. Product 102 may generate various forms of output 108 in response to processing of the test input data. Output 108 may include, for example, an approval of a particular one of the subset of current transactions 122, one or more determinations of an item involved in a transaction being valid or invalid, successful or failed authentications of users 150 (or test user substitutions), and the like. Evaluation computer system 101 may store output 108, and/or compare output 108 to production results received via transaction service interface 115.

It is noted that the embodiment of FIG. 1 is merely an example. A transaction service is used as an example online service. The concepts disclosed herein may be applied to other types of online services, such as cloud computing services. Some elements of system 100 have been omitted for clarity. For example, other embodiments may include an exchange of messages between various entities. Such an embodiment is shown in FIG. 2.

Figure 2:
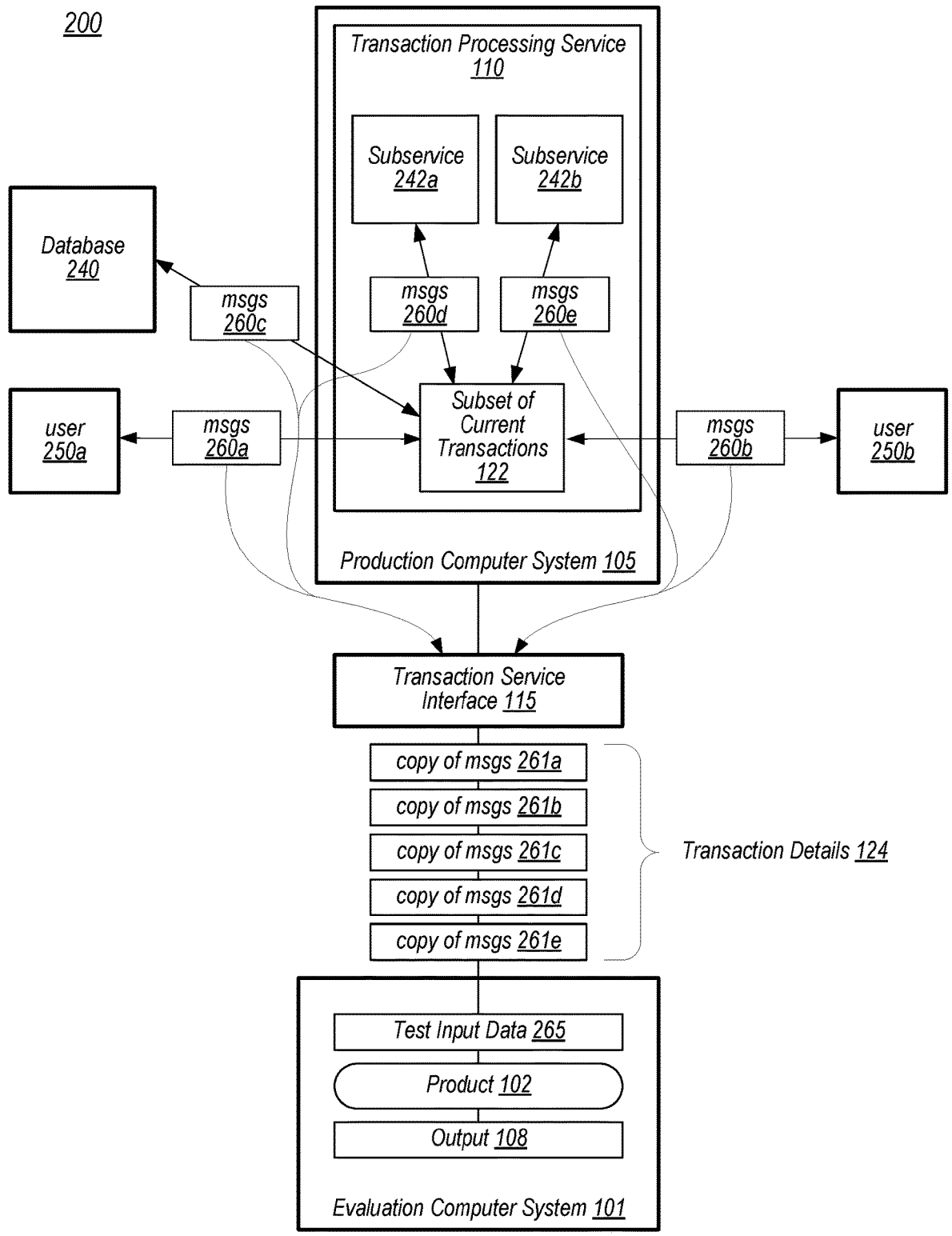
FIG. 2 shows a block diagram of another embodiment of an online service that includes an online production computer system and an evaluation computer system.

Turning to FIG. 2, another embodiment of a system for evaluating a new product using transaction details from a transaction processing service is illustrated. The embodiment of FIG. 2 depicts how transaction details may be accessed in real-time from a subset of current transactions. System 200 includes several elements that are shown in FIG. 1, including evaluation computer system 101, product 102, output 108, production computer system 105, transaction processing service 110, transaction service interface 115, and the subset of current transactions 122. These elements function as described in regards to FIG. 1, unless described otherwise below. As shown, system 200 also includes database 240, subservices 242a and 242b (collectively subservices 242), users 250a and 250b, messages 260a-260e and copies of messages 261a-261e (collectively messages 260 and copies of messages 261), and test input data 265.

As illustrated, processing of the subset of current transactions 122 includes a plurality of sub-actions. These sub-actions include exchanging, by production computer system 105, messages 260 that include transaction details 124. Transaction processing service 110 exchanges messages 260 with users 250, database 240, and subservices 242 as part of the processing of the subset of current transactions 122. Users 250, in various embodiments, may be individuals, businesses, government offices, or other types of organizations that utilize transaction processing service 110 to perform the transactions with other users of the system. In some embodiments, users 250 may include entities that are a part of an organization that operates transaction processing service 110. Database 240 may be any suitable type of database used to process the transactions initiated by users 250, for example, online data repositories for storing digital items to be transferred, credit databases for validating payment conditions, order fulfillment databases for third-party vendors capable of shipping physical items, and the like. Subservices 242 may be a user account database used to authenticate user 250a and user 250b before approving a particular transaction between them. Subservices 242 may also include any service module called by transaction processing service 110 to perform a sub-action, such as modules for performing user authentications, assessing risks associated with a transaction, determining user rights to items being transacted, and the like.

As an example of a transaction, user 250b may initiate one of the subset of current transactions 122 involving a payment by user 250b in exchange for a media file from user 250a. One or more messages 260b are exchanged between user 250b and transaction processing service 110 to initiate a particular transaction of the subset of current transactions 122. One or more messages 260*a* are exchanged between transaction processing service 110 and user 250*a* to confirm the details of the particular transaction. Transaction processing service 110 may exchange one or more messages 260*d* with subservice 242*a* to authenticate both user 250*a* and user 250*b*. Transaction processing service 110 sends messages 260*c* to database 240 to verify that user 250*a* has rights to the media file and, if so, retrieve the media file that is to be sent to user 250*b*. Messages 260*e* are exchanged within transaction processing service 110 to subservice 242*b* to assess a risk of fraudulent activity by either user 250*a* or 250*b*. It is noted that this is merely one example of a transaction that a transaction processing service may perform.

Evaluation computer system 101, using transaction service interface 115, monitors some or all of messages 260 exchanged on production computer system 105. For example, transaction processing service 110 may utilize a particular messaging protocol, such as a publish-subscribe messaging protocol (e.g., Apache Kafka or IBM MQ). In a publish-subscribe messaging system, transaction processing service 110 may send one or more of messages 260 to a messaging server within or coupled to production computer system 105. A particular topic is included with each sent (published) message 260 that indicates a particular type of receiver (subscriber) to which the message is intended. Users 250, databases 240, and subservice 242 may each subscribe to a relevant type of message, and receive an indication when transaction processing service sends a message intended for the respective subscriber. Users 250, databases 240, and sub service 242 may then respond to transaction processing service 110 by publishing respective ones of messages 260 with a topic that indicates that transaction processing service 110 is the intended receiver.

Use of such a publish-subscribe messaging system may allow evaluation computer system 101, via transaction service interface 115, to subscribe to the various topics involved in the types of transactions that are relevant to the evaluation of product 102. Thus, transaction service interface 115 may snoop on messages 260 exchanged by production computer system 105. Transaction service interface 115 may then copy relevant ones of messages 260 to evaluation computer system 101. Evaluation computer system 101 may then extract transaction details 124 from the copies of messages 261, and use transaction details 124 to generate test input data 265.

As disclosed above, test input data 265, in various cases, may or may not be altered from the content of the copies of messages 261. In some cases, product 102 may be an evaluation version of transaction processing service 110 implemented on evaluation computer system 101, and therefore, may receive test input data 265 as the copies of messages 261 and process the transactions in parallel with the production version of transaction processing service 110 implemented on production computer system 105. Evaluation of product 102 may then include a comparison of the production results generated by transaction processing service 110 to the evaluation results generated by product 102. It is noted that, as used herein, "parallel" refers to operations occurring or being performed in an overlapping manner. Use of the term parallel is not intended to imply that the operations must begin and end at a same time, although such an occurrence is not omitted.

In other cases, product 102 may be an evaluation version of subservice 242*b*. In such a case, transaction details 124 may include copies of messages 261*e* and may exclude some or all of copies of messages 261*a*-261*d*. As in the above example, test input data 265 is generated from transaction details 124 and product 102 processes test input data 265 in parallel with sub-actions associated with subservice 242*b*. Results produced by subservice 242*b* may then be compared with evaluation results generated by product 102.

In order to evaluate product 102 in parallel with the processing of the subset of current transactions 122 by production computer system 105, transaction details 124 are accessed and used to generate test input data 265 in real-time. As stated above, real-time refers to utilizing details extracted from a particular transaction while the particular transaction is being processed by the production computer system, or within a short time period of the particular transaction completing production processing. In some embodiments, real-time may correspond to using ninety-nine or one hundred percent of transaction details 124 within one second of evaluation computer system 101 receiving the respective transaction detail. In other embodiments, real-time may correspond to using eighty-five percent of transaction details 124 within ten minutes of evaluation computer system 101 receiving the respective transaction detail. In various embodiments, the percentages of transaction details used and the time period for using them may vary between these disclosed values. One goal for use of production transaction details in real-time may be to reduce a need for memory to store and maintain a database of test cases of transaction details to be used as test input data. By utilizing the transaction details of a current transaction that is being processed in a production system, the transaction details may be quickly used and then discarded or archived once the evaluation test are complete. In addition, results from the production processing of the current transaction may be compared to evaluation results without a need to store the production results any longer than a time difference between the production and evaluation processing of the current transaction.

It is noted that system 200 of FIG. 2 is an example for demonstrating the disclosed concepts. Although two databases and one subservice are shown, any suitable number of each may be included in other embodiments. Five sets of messages are illustrated as being accessed for transaction details. In other embodiments, however, additional messages may be in use at a given point in time.

The embodiment of FIG. 2 illustrates how transaction details may be collected. As disclosed, the transaction details are collected from a subset of current transactions. An embodiment demonstrating how a given one of the current transactions may be selected is shown in FIG. 3.

Figure 3:
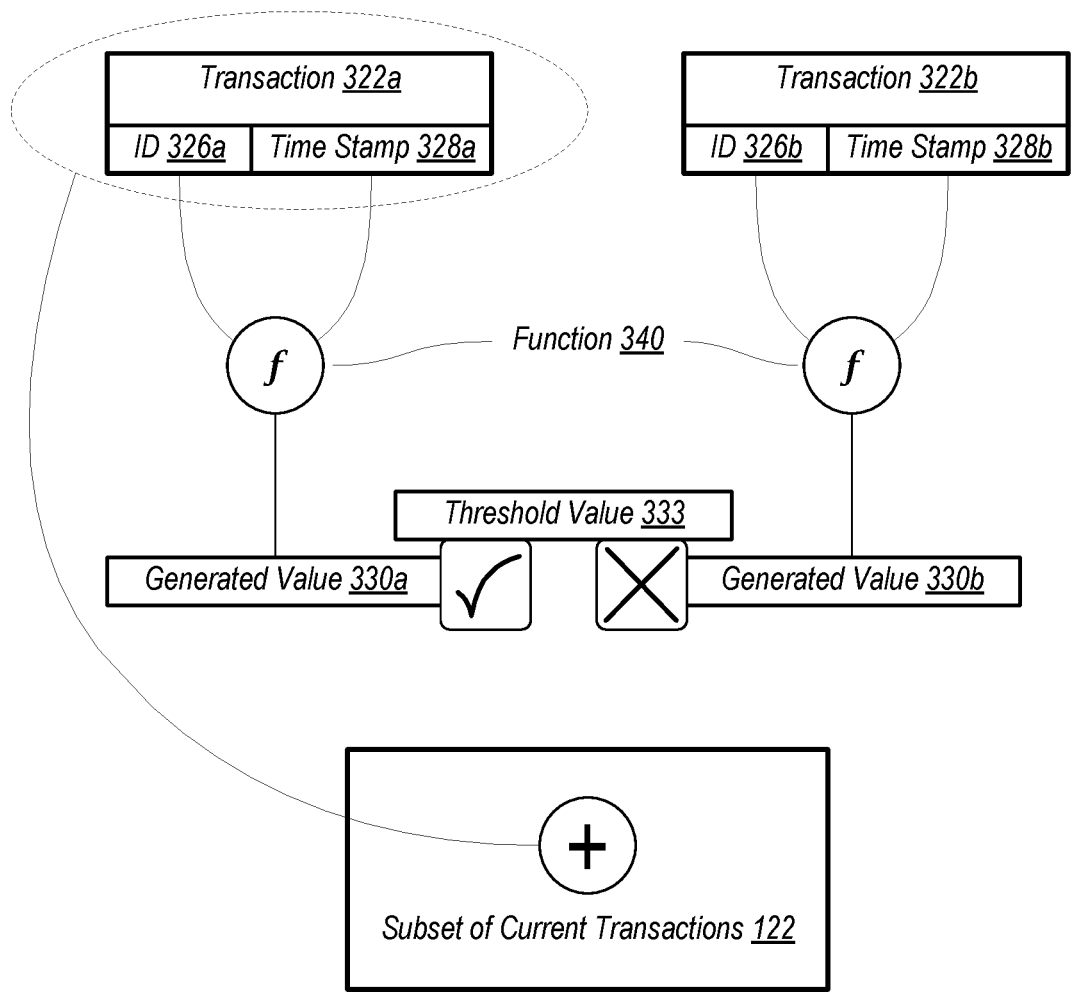
FIG. 3 depicts a block diagram of an embodiment of modules used to select a subset of transactions.

Moving to FIG. 3, a block diagram of an embodiment of two current transactions being considered for inclusion in a subset of current transactions is shown. In the embodiment of system 300, transactions 322*a* and 322*b* are two transactions included in current transactions 120 in FIGS. 1 and 2. Each of transactions 322*a* and 322 *b* include respective transaction identification values (ID 326*a* and ID 326*b*), and respective time stamps 328*a* and 328*b*. Using function 340, generated value 330*a* is determined for transaction 322*a* while generated value 330*b* is determined for transaction 322*b*. Based on generated values 330*a* and 330*b*, transaction 322*a* is selected for inclusion in the subset of current transactions 122 while transaction 322*b* is not selected.

In the present embodiment, transaction service interface 115 receives IDs 326*a* and 326*b* and time stamps 328*a* and 328*b*. To determine generated value 330*a*, transaction service interface 115 uses at least a portion of ID 326*a* and time stamp 328*a* in function 340. In some embodiments, function 340 may multiply ID 326*a* by time stamp 328*a*. In other embodiments, a greater degree of randomness may be desired when selecting transactions for inclusion in the subset of current transactions 122. Consecutive ones of current transactions 120 may have similar IDs 326 and time stamps 328, resulting in similar generated values 330 if a multiplication function is used. To increase the degree of randomness, function 340 may be, for example, a hashing function that produces a widely varying result even when its operands have similar values. Such a widely varying result may improve randomness when selecting from consecutive transactions.

After transaction service interface 115 determines generated value 330a, generated value 330a is compared to threshold value 333. Generated value 330a satisfies threshold value 333, resulting in transaction 322a being selected for inclusion in the subset of current transactions 122. Transaction service interface 115 repeats this process for transaction 322b, using ID 326a and time stamp 328b to determine generated value 330b. Generated value 330b does not satisfy threshold value 333, and transaction 322b is, accordingly, not selected.

It is noted that, to "satisfy a threshold" may vary between embodiments. In some embodiments, satisfying a threshold may refer to the generated value being less the threshold, or alternatively, greater than the threshold. Whether a generated value equaling the threshold value is considered satisfying the threshold may be a design choice.

Threshold value 333 is selected such that a particular percentage of current transactions 120 are selected for inclusion in the subset of current transactions 122. For example, if a typical number of current transactions 120 is 1000 per second, and evaluation computer system 101 is capable of providing test input data corresponding to 20 transactions per second to product 102, then threshold value 333 may be selected such that approximately two percent of generated values 330 will satisfy the threshold value.

It is noted that the illustrated blocks in FIG. 3 are simplified for clarity. In other embodiments, additional blocks may be included. For example, one or more queues may be included in other embodiments to store IDs 326 and time stamps 328 until the respective generated values are determined.

FIGS. 2 and 3 provide additional details regarding monitoring and selection of transactions for use in generating test input data for evaluating product 102. Various types of products may be evaluated in a system incorporating the disclosed features. Additional details regarding the types of products under evaluation are provided in FIG. 4.

Figure 4:
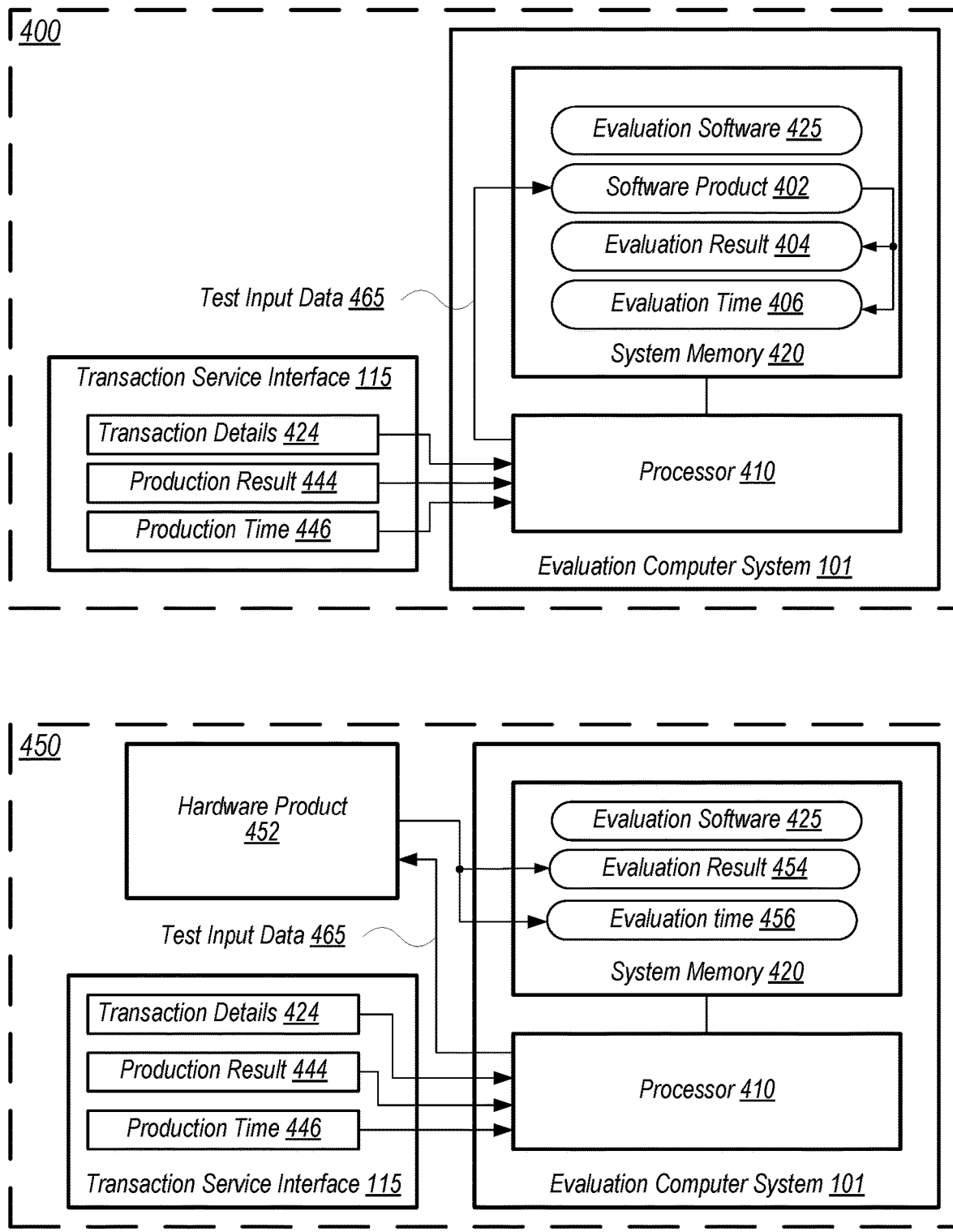
FIG. 4 illustrates a block diagram of two embodiments of an evaluation system.

Proceeding to FIG. 4, two block diagrams depicting systems including an evaluation computing system and a transaction service interface are illustrated. FIG. 4 demonstrates that either a software product or a hardware product may be evaluated using the concepts disclosed herein. Both systems 400 and 450 include evaluation computer system 101 and transaction service interface 115, used to evaluate a product under test. In each system, evaluation computer system 101 includes processor 410 and system memory 420 that stores evaluation software 425. System 400 further includes software product 402 as a product under evaluation, while system 450 include hardware product 452 as a product under evaluation.

In system 400, the product under evaluation is software product 402. In some embodiments, software product 402 is an evaluation version of the transaction processing service that is an update to the production version of transaction processing service 110 in FIGS. 1 and 2. In other embodiments, software product 402 may be a upgrade of a particular software module in transaction processing service 110 or a new software module that adds one or more new features to transaction processing service 110. As illustrated, software product is shown as being stored in system memory 420 of evaluation computer system 101, along with evaluation software 425 that is used to perform the evaluation of software product 402. In other embodiments, software product 402 may be stored in a different memory, separate from evaluation software 425.

Processor 410 executes evaluation software 425, causing evaluation computer system 101 to generate a simulation environment that may interact with software product 402 in much the same manner as if software product 402 was being executed on production computer system 105. Software product 402 may be an evaluation version of transaction processing service 110 or may be an evaluation version of a subservice, such as subservice 242a or 242b in FIG. 2. Evaluation software 425 may simulate a suitable amount of transaction processing service 110, such that software product 402 is capable of processing test input data 465 in a similar manner as the production computer system 105. For example, if software product 402 is an evaluation version of subservice 242b, then evaluation software 425 may emulate other portions of transaction processing service 110, such as subservice 242a, as well as emulating interfaces to user 250a and 250b, and database 240.

Execution of evaluation software 425 causes evaluation computer system 101 to capture output and metrics associated with the evaluation test of software product 402, including evaluation result 404 and evaluation time 406. Performing tests on software product 402 may include evaluating a particular transaction of the subset of current transactions 122 to determine whether the particular transaction is valid. Transaction details 424 correspond to particular ones of transaction details 124 associated with the particular transaction. Processor 410 uses transaction details 424 to generate test input data 465 that causes software product 402 to generate evaluation result 404. Evaluation computer system 101 further determines an amount of time, evaluation time 406, that software product 402 used to complete the processing of test input data 465.

In parallel, production computer system 105 processes the particular transaction, generating production result 444 in an amount of time captured as production time 446. Transaction service interface 115 receives production result 444 and production time 446 and passes this information along to evaluation computer system 101. As part of the evaluation of software product 402, evaluation computer system 101 compares evaluation result 404 (for the particular transaction produced by the evaluation computer system) to production result 444 (for the particular transaction produced by the production computer system). In addition, evaluation computer system 101 compares production time 446 to evaluation time 406 during the performed tests. In various embodiments, evaluation computer system 101 may store the captured results and/or make a pass-fail judgement for software product 402.

In system 450, the product under evaluation is hardware product 452. In some embodiments, hardware product 452 may be an updated version of production computer system 105 or a replacement for a portion of production computer system 105. In other embodiments, hardware product 452 may be used to implement new features into transaction processing service 110. In various embodiments, hardware product 452 may be a complete computer system capable of implementing transaction processing service 110, or one or more peripherals to be added to production computer system 105 to replace obsolete or malfunctioning components, or added to provide new features or increased performance to production computer system 105.

For the evaluation tests, hardware product 452 is coupled to communicate with evaluation computer system 101. This coupling may be accomplished in any suitable manner, such as by one or more cables (e.g., universal serial bus, Ethernet, or SATA cables), by a standard connector (e.g., a PCI expansion slot), by a wireless interface (e.g., Bluetooth or WiFi), by a custom interface (e.g., a custom test fixture or a proprietary wireless protocol), or a combination thereof. The coupling allows for two-way communication between hardware product 452 and evaluation computer system 101 for performing the evaluation tests to determine whether hardware product 452 will be added to production computer system 105.

In a similar manner as for testing software product 402, evaluation computer system 101 sends, to hardware product 452, test input data 465 that is based on transaction details 424. Transaction details 424 are details related to a particular transaction of the subset of current transactions 122. As part of the evaluation, hardware product 452 processes test input data 465 while, in parallel, production computer system 105 processes the corresponding particular transaction. After production computer system 105 completes processing of the particular transaction, transaction service interface 115 receives, and provides to evaluation computer system 101, production result 444 and production time 446 from production computer system 105. After hardware product 452 completes processing of test input data 465, evaluation computer system 101 receives evaluation result 454 and evaluation time 456 from hardware product 452. Evaluation computer system 101 compares production result 444 to evaluation result 454 to determine if hardware product 452 determined a same result as production computer system 105. Evaluation computer system 101 also compares production time 446 to evaluation time 456 to determine if hardware product 452 determined evaluation result 454 in less time than production computer system 105 determined production result 444. In a similar manner as for system 400, evaluation computer system 101 may store the captured results and/or make a pass-fail judgement for software product 402.

It is noted that evaluation software 425 is used for evaluating both software product 402 and hardware product 452. In some embodiments, evaluation software 425 may be capable of supporting both hardware and software evaluations. In other embodiments, evaluation software 425 may include a suite of test software modules, including a first set of software modules for evaluating software and a second set of software modules for evaluating hardware. The first and second sets may or may not include common software modules, and may be selected prior to initiating evaluation tests by, for example, a test engineer.

The embodiments of FIG. 4 are examples for demonstrating the disclosed concepts. For clarity, some features have been omitted. For example, production computer system 105 is not shown in either system 400 or system 450.

FIGS. 1-4 have illustrated how a new product may be evaluated as part of a product development process. Multiple operations may be included in a product development process. An example development process is described below.

Figure 5:
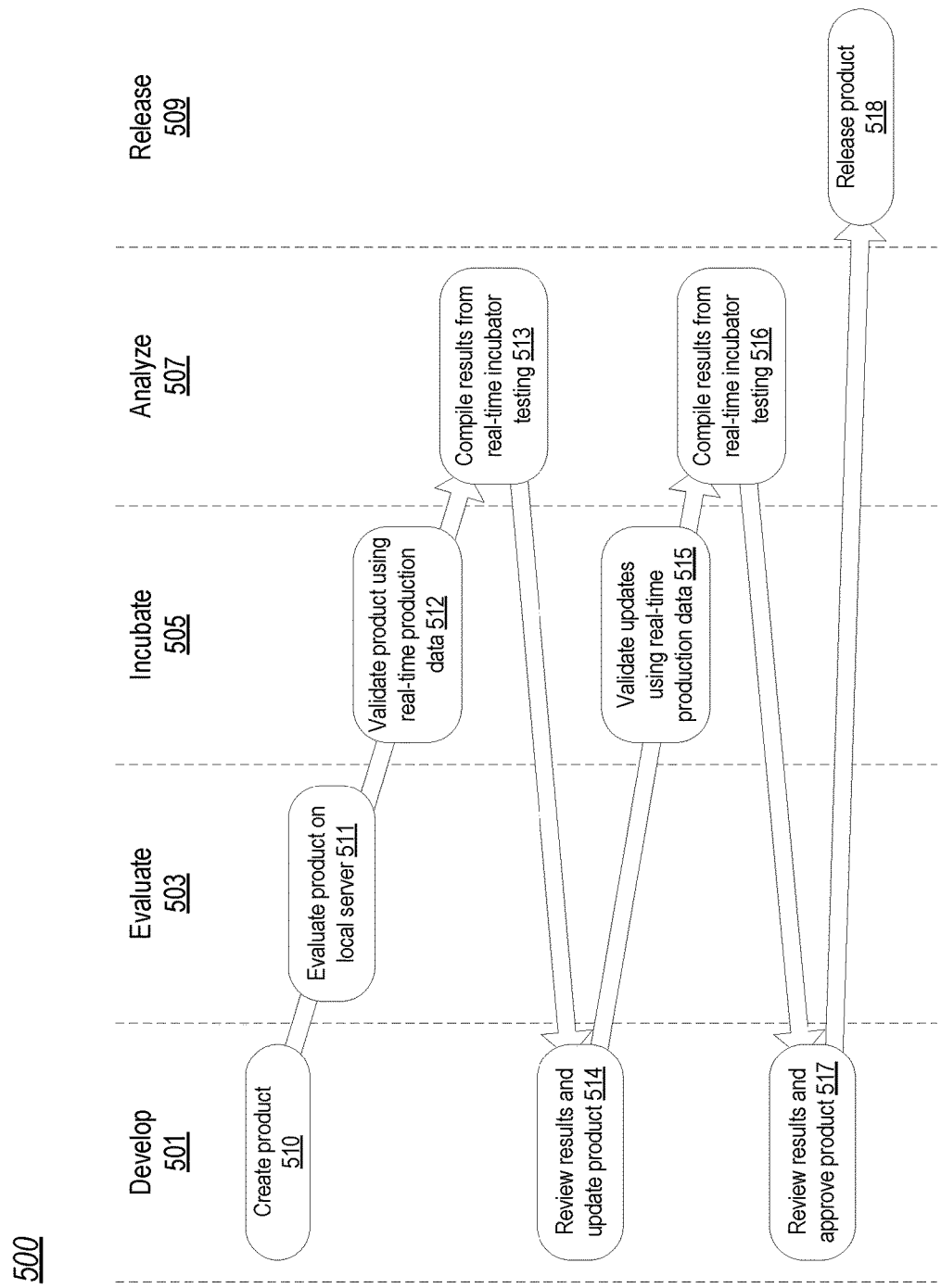
FIG. 5 is a chart illustrating an embodiment of a flow for developing, evaluating, and releasing a new product.

Turning now to FIG. 5, a chart is shown that depicts a process flow for developing a new product and releasing the new product to a production computer system. Chart 500 depicts an example flow for a new product through five development phases: develop 501, evaluate 503, incubate 505, analyze 507, and release 509. Operations 510-518 illustrate that the new product makes eight transitions among the five development phases to reach a release to production, including multiple operations within some of the phases.

The new product is initiated in the develop phase 501. In develop phase 501, the new product is created in operation 510. Creation of the new product may include decisions regarding specifications and determinations regarding needs for new software and/or hardware for the new product. As previously stated, a new product relative to a transaction processing service may correspond to adding new features to the transaction processing service and/or improving a performance of the transaction processing service. In some cases, the new product may be a new version of the transaction processing service or a replacement for a production computer system. Hardware and software that may be developed for the new product may not be sold directly as a product. Instead, the new product contributes to the operation of the transaction processing service. As disclosed above, the new product may be an updated version of a software or hardware module that corresponds to a subservice within transaction processing service. This subservice may interact with other portions of transaction processing service 110 rather than interacting directly with users of transaction processing service 110. Product developers, including, for example, software and/or hardware developers, create an initial version of the new product based on agreed upon target specifications.

Once the initial version of the new product has been developed, the new product moves into evaluate phase 503 in operation 511. In evaluate phase 503, the new product is tested to determine its limits and assess how well it performs in comparison to the target specifications. These evaluation tests are performed on a local server that may not be coupled to a production server, allowing the new product to be tested without risk to performance of the production transaction processing service. Using a local server for the initial evaluation may also allow product developers flexibility for starting and stopping tests, as well as control over the types of test input data that are used for the evaluation test. This level of control may allow developers to focus tests on particular types of test cases that may be of particular importance for the new product to process. Using a specific set of test input data, however, may also hide potential issues with the new product by intentionally or unintentionally avoiding particular input that the new product may receive in a less controlled production environment.

Once the evaluation tests have been completed, the product developers may move the new product into incubate phase 505. In operation 512, the new product is validated using real-time production data. In incubate phase 505, the new product may be added to an evaluation computer system such as evaluation computer system 101 in FIGS. 1, 2, and 4. The new product may now correspond to product 102 and be tested using transaction details extracted from a subset of current transactions being processed by the production version of the transaction processing service. In some embodiments, stored test cases, e.g., such as used in the evaluate phase 503, may be intermixed with the test input data generated from the real-time transaction details.

By using details from production transactions that are currently being processed, the new product may be exposed to test cases that were not considered by the product developers. Real users of the transaction processing system may generate a particular combination of transaction details that were not foreseen by the product developers, thereby exposing potential issues that the new product might have in a production environment, without risking operation of the production version transaction processing system. In addition, by using transaction details from production transactions in process, a large amount of test input data may be generated without a need to store and maintain a large test case database. Instead, the new product may remain in incubate phase 505 until a sufficient amount of test input data has been processed by the new product and the corresponding test results have been captured. In addition, production results for the subset of current transaction used for generating the test input data may also be captured.

When the new product has completed testing in incubate phase 505, the product developers move the new product into analyze phase 507. In operation 513, results from the real-time tests performed in the incubate phase 505 are compiled. Evaluation results may be compared to production results to determine an accuracy of the performance of the new product. In addition, elapsed times for the evaluation processing may be compared with elapsed times for the corresponding production processing, allowing a determination if the new product may improve processing bandwidth of the transaction processing system or not.

The compiled results are sent back to the product developers in the develop phase 501. In operation 514, the results are reviewed and any desired updates may be made to the new product to address any failures, or other performance issues. As shown, evaluate phase 503 may be skipped in a second pass through the phases and the updated new product is sent back to incubate phase 505. In operation 515, the real-time tests may be repeated. It is noted that, in this second-pass through incubate phase 505, the current transactions being processed by the production version of the transaction processing service will be different from the transactions that were processed during the first-pass in operation 512. Therefore, test input data used for operation 515 may differ from the test input data used in operation 512.

Once sufficient test input data has been processed, the new product is again moved to analyze phase 507 and test results are compiled, including the production results, in operation 516. Another review by the product developers is performed in the develop phase 501. If, in operation 517, the developers approve of the latest results, then the new product may enter release phase 509. In operation 518, the new product is installed into the production version of the transaction processing service. Any new hardware and software associated with the new product may be installed in or coupled to a production computer system.

It is noted that the development flow illustrated in chart 500 is merely an example. Other embodiments may include a different number of phases and/or utilize a different number of operations within each of the phases.

The processes and systems described above may be implemented using a variety of methods. Several methods are described below, in regards to FIGS. 6-8, for use with testing of a new product using details from production transactions.

Figure 6:
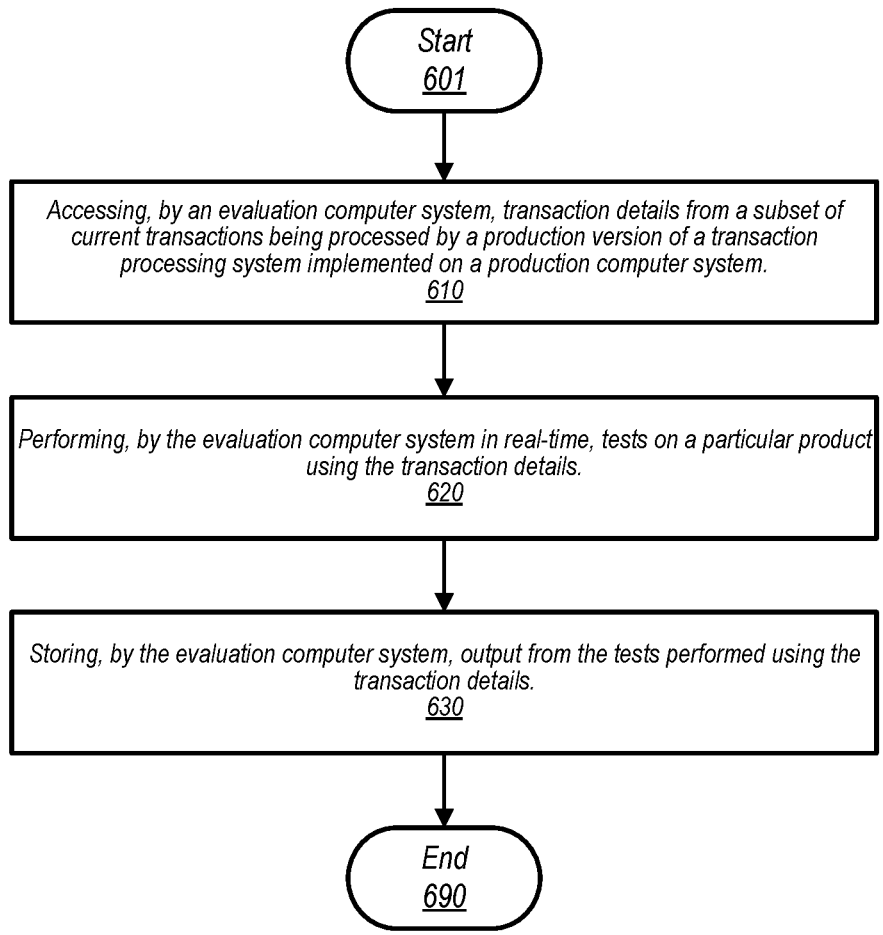
FIG. 6 is a flow diagram illustrating an embodiment of a method for evaluating a new product using production transaction details.

Moving now to FIG. 6, a flow diagram of an embodiment of a method for evaluating a product using details from transactions currently being processed is illustrated. Method 600 may, in some embodiments, be performed by evaluation computer system 101 of FIGS. 1, 2, and 4. Evaluation computer system 101 may, for example, include (or have access to) a non-transitory, computer-readable medium having program instructions stored thereon that are executable by the server computer system to cause the operations described with reference to FIG. 6. Referring collectively to FIGS. 1 and 6, method 600 may begin in block 601.

As illustrated, method 600 includes accessing, by an evaluation computer system, transaction details from a subset of current transactions being processed by a production version of a transaction processing service that is implemented on a production computer system (block 610). Transaction processing service 110 is implemented on production computer system 105 to process transactions between two or more of users 150. The transactions may include an exchange of any of the various information or items that are described above. Current transactions 120 may correspond to transactions being processed by transaction processing service 110 during evaluation tests of product 102, implemented on evaluation computer system 101. Evaluation computer system 101, using transaction service interface 115, identifies the subset of current transactions 122 and accesses transactions details 124 that correspond to the subset of current transactions 122.

Method 600 also includes performing, by the evaluation computer system in real-time, tests on a particular product using the transaction details (block 620). Evaluation computer system 101 receives transaction details 124 and uses the details to generate test input data for evaluating product 102. As is described above, product 102 may be hardware, software, or a combination of the two. For example, product 102 may be software that comprises an updated version of transaction processing service 110. As another example, product 102 may be new hardware that will replace some or all of production computer system 105. It is noted that use of each detail of transaction details 124 may occur within several seconds of receiving the respective detail.

Additionally, method 600 includes storing, by the evaluation computer system, output from the tests performed using the transaction details (block 630). As the evaluation tests are performed, product 102 may generate results associated with corresponding transaction details 124. For example, one transaction of the subset of current transactions 122 may have 15 associated ones of transaction details 124. One or more results produced by product 102 may correspond to this one transaction and these results are captured and stored by evaluation computer system 101. In addition, corresponding production results may be generated by transaction processing service 110 for the same one transaction, and these production results may also be captured and stored by evaluation computer system 101. In some embodiments, instead of capturing all results, evaluation computer system 101 may compare evaluation and production results and instead store an indication if the evaluation results matched the production results or that product 102 otherwise produced expected or unexpected results. The method ends in block 690.

Method 600 describes an example process for evaluating a product using a subset of current transactions. The subset of current transactions may be selected in a variety of ways. One such method is described below in regards to FIG. 7.

Proceeding now to FIG. 7, a flow diagram for an embodiment of a method for selecting and adding a current transaction to a subset of current transactions used for generating test input data is illustrated. In various embodiments, method 700 may be performed by evaluation computer system 101 of FIGS. 1, 2, and 4 to select a particular one of current transactions 120 to add to the subset of current transactions 122. As presented, evaluation computer system 101 may include (or have access to) a non-transitory, computer-readable medium having program instructions stored thereon that are executable by the server computer system to cause the operations described with reference to FIG. 7. Referring collectively to FIGS. 1 and 7, method 700 may begin in block 701.

At block 710, method 700 includes detecting, by the evaluation computer system, an initiation of a particular transaction. As previously described, transaction processing service 110 may utilize a particular messaging protocol for communicating with various entities, such as users, databases, and subservices. Using transaction service interface 115, evaluation computer system 101 may snoop on messages sent using the particular messaging protocol, including messages that indicate an initiation of a transaction. In some embodiments, transaction processing service 110 may queue transactions until they are scheduled for processing. A particular type of message may be used to initiate adding a new transaction to this queue. Transaction service interface 115 detects when such a message is exchanged for initiating the particular transaction.

Method 700, at block 720, also includes generating, by the evaluation computer system, a value associated with the particular transaction using an ID of the transaction and a time stamp. After transaction service interface 115 detects the initiation of the particular transaction, an identification value (ID) and a time stamp associated with the particular transaction are received. The ID value may be a value assigned to the particular transaction after it has been initiated. The time stamp may correspond to a point in time when a first message associated with the particular transaction is sent, or a point in time when the transaction is initiated within transaction processing service, or when the particular transaction is placed in a queue. Evaluation computer system 101 uses these values to generate a value to associate with the particular transaction. As described above, this generated value may be determined using a hashing function in order to provide a degree of randomness in generated values for transactions with similar ID values and time stamps. In other embodiments, one or more lookup tables may be used instead of, or in combination with, a hashing function.

At block 730, further operations of method 700 include adding, by the evaluation computer system, the particular transaction to the subset of current transactions in response to determining that the generated value satisfies a particular threshold. In the present embodiment, evaluation computer system 101 compares the generated value associated with the particular transaction to a threshold value. If the generated value reaches the threshold value, then the particular transaction is added to the subset of current transactions 122. Otherwise, the particular function is not used for generating test input data for evaluating product 102. It is noted that the threshold value may be selected in order to select a particular number or percentage of current transactions 120 for use with the evaluation of product 102. In some embodiments, the threshold value may be adjusted based on a number of current transactions 120.

At block 740, method 700 further includes extracting, by the evaluation computer system using a transaction service interface, the transaction details from the particular transaction by copying messages generated during the processing of the particular transaction. Using transaction service interface 115, evaluation computer system 101 snoops on messages that are exchanged by transaction processing service 110 during the processing of the particular transaction. Evaluation computer system 101 copies the messages that are associated with the particular transaction. From these copied messages, transaction details 124 are extracted.

Method 700 further comprises, at block 750, using, by the evaluation computer system, the transaction details for the particular transaction as test input data for the particular product. In some embodiments, transaction details 124 may include any suitable details about the users involved in the particular transaction, including information used to authenticate their respective identities, information used to verify that they have rights to items being exchanged in the transaction, information used to judge a risk of one or more of the users involved with the particular transaction acting fraudulently, and any other details that could be used to complete a transaction. In other embodiments, transaction details 124 may include information associated with processing by one or more subservices within transaction processing service 110 and, therefore, may exclude details of the particular transaction that are not relevant to the evaluation of product 102. After transaction details 124 have been extracted from the copied messages, evaluation computer system 101 generates test input data which may then be used in a simulated production environment used for evaluating the performance of product 102. Method 700 ends in block 790.

Method 700 describes a process for selecting and using transaction details to evaluate a product. Evaluation of the product may include observing and recording various performance characteristics of the product as it is used to process test input data. An example process for evaluating the product is disclosed below in regards to method 800.

Figure 8:
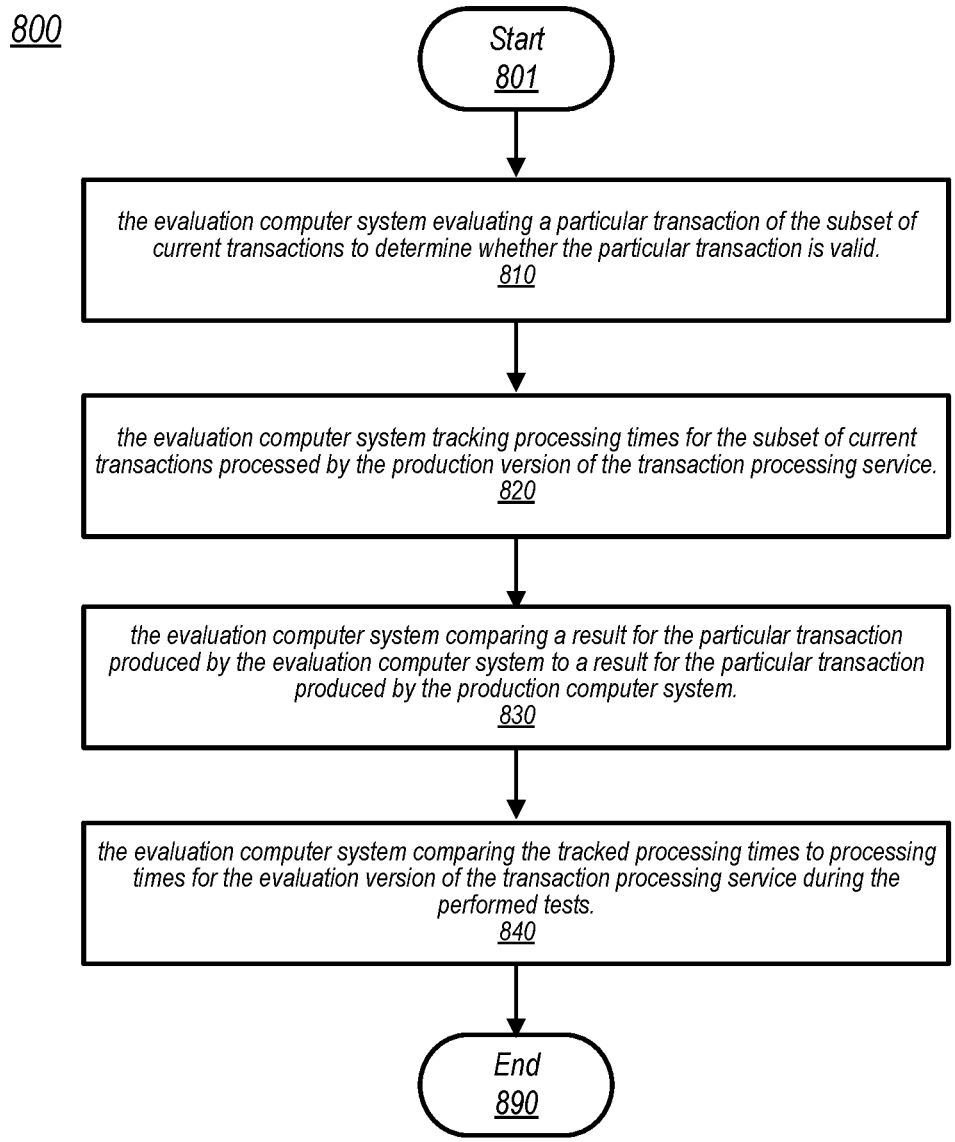
FIG. 8 is a flow diagram illustrating an embodiment of a method for assessing results of an evaluation of a new product.

Moving to FIG. 8, a flow diagram of an embodiment of a method for evaluating results of a product test is illustrated. Method 800 may be performed by evaluation computer system 101 of FIGS. 1, 2, and 4 to compare evaluation results from a product under evaluation to production results from a production version of the product. Evaluation computer system 101 may, in various embodiments, include or have access to a non-transitory, computer-readable medium having program instructions stored thereon that are executable by the server computer system to cause the operations described with reference to FIG. 8. Referring collectively to FIGS. 1 and 8, method 800 begins in block 801 with a product undergoing evaluation tests.

Method 800 comprises, at block 810, the evaluation computer system evaluating a particular transaction of the subset of current transactions to determine whether the particular transaction is valid. In the current embodiment, product 102 is an updated version of a subservice that is used to determine whether a transaction is valid or not. Product 102 may be evaluated to determine if it functions correctly as compared to a production version of the subservice. Test input data generated from suitable transaction details associated with a particular transaction of the subset of current transactions 122 is sent to product 102. Product 102 is operating in a simulation environment generated by evaluation computer system 101, and processes the test input data in a manner similar to how the particular transaction is processed by transaction processing service implemented on production computer system 105. Results from the processing of the test input data by product 102 include a determination whether the particular transaction is valid. Evaluation computer system 101 also receives an indication of the production result for the particular transaction as determined by transaction processing service 110.

Method 800 may include, at block 820, the evaluation computer system tracking processing times for the subset of current transactions processed by the production version of transaction processing service 110. Evaluation computer system 101 monitors progress of the processing, by product 102, of the test input data associated with the particular transaction. After product 102 completes the processing, evaluation computer system 101 determines a processing time for product 102 to process this test input data. The evaluation computer system, using transaction service interface 115, also monitors an amount of time consumed by transaction processing service 110 to process the particular transaction.

At block 830, method 800 includes the evaluation computer system comparing a result for the particular transaction produced by the evaluation computer system to a result for the particular transaction produced by the production computer system. Evaluation computer system 101 compares the evaluation result to the production result associated with the particular transaction. In the current embodiment, the results correspond to a determination whether the particular transaction is valid. In other embodiments, the results may be associated with other aspects of the transaction, such as a decision of whether or not the particular transaction is approved, whether one or more users involved in the particular transaction are successfully authenticated, a likelihood that the particular transaction is fraudulent, or other such results. In various embodiments, evaluation computer system 101 may save a result of the comparison along with the production and evaluation results, or may make and store a pass/fail judgement of product 102.

At block 840, further operations of method 800 include the evaluation computer system comparing the tracked processing times to processing times for the evaluation version of the transaction processing service during the performed tests. In addition to comparing results, evaluation computer system 101 compares the evaluation processing time to the production processing time. In some embodiments, product 102 may be developed, at least in part, to reduce processing time of transactions by transaction processing service 110. Accordingly, product 102 may be expected to process the particular transaction in less time than transaction processing service 110 takes to process the same transaction. Even if reduced processing time is not a direct goal for product 102, developers may have an expectation that product 102 does not adversely increase a processing time for the particular transaction. Evaluation computer system 101 may, in various embodiments, store each of the production and evaluation processing times or may instead store a value corresponding to a delta between the evaluation and production processing times. The method ends at block 890.

It is noted that operations described for the methods illustrated in FIGS. 6-8 may be performed by various processor cores in evaluation computer system 101 and, therefore, at least some of the described operations may occur in parallel. In some embodiments, operations from two or more methods may be performed in combination. For example, methods 700 and or 800 may be performed as respective parts of method 600.

Example Computer System

Figure 9:
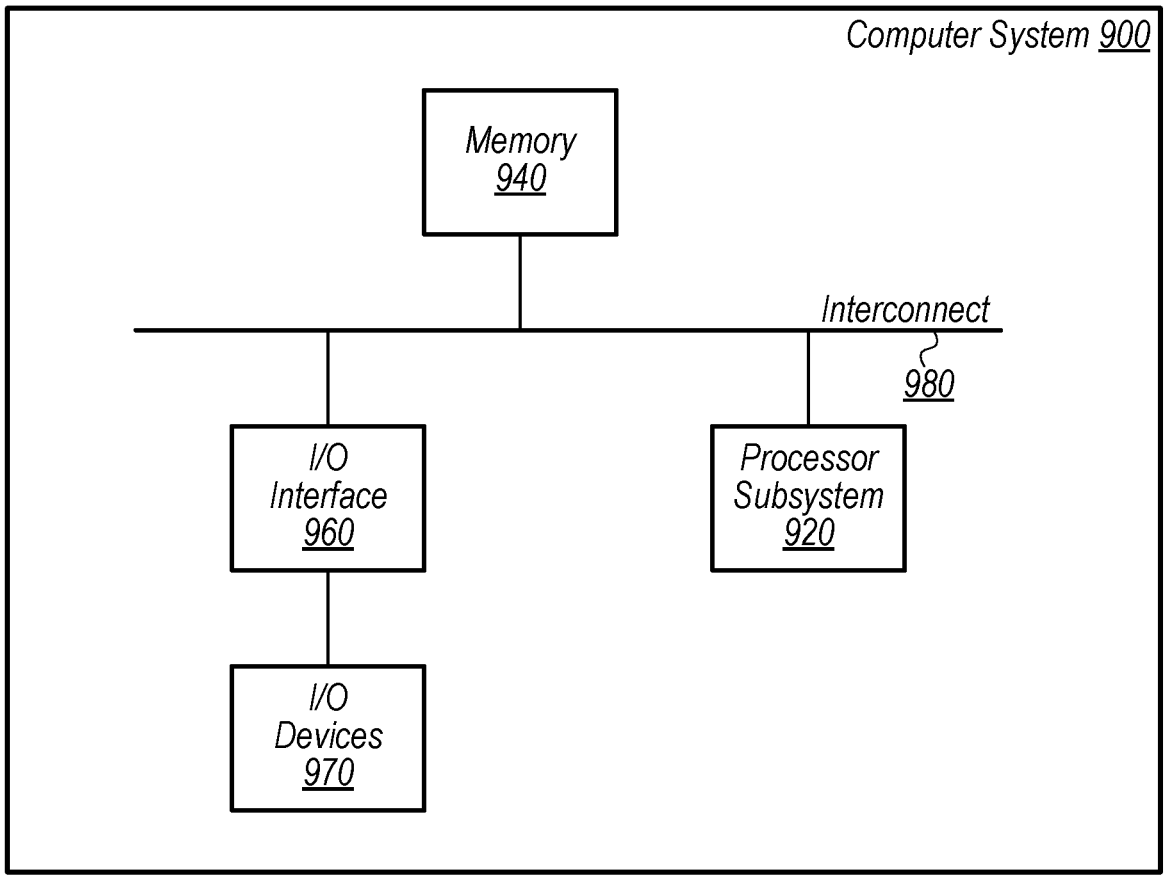
FIG. 9 is a block diagram illustrating an example computer system, according to some embodiments.

Referring now to FIG. 9, a block diagram of an example computer system 900 is depicted, which may implement one or more computer systems included in, for example, evaluation computer system 101 and production computer system 105 of FIGS. 1 and 2. Computer system 900 includes a processor subsystem 920 that is coupled to a system memory 940 and I/O interface 960 via an interconnect 980 (e.g., a system bus). I/O interface 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein. System memory 940 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interface 960 may include any suitable number of various types of interfaces configured to couple to and communicate with other devices, according to various embodiments. In one embodiment, I/O interface 960 is a bridge chip (e.g., Southbridge) from a front-side to one or more back-side buses. I/O interface 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above. As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
accessing, by an evaluation computer system, transaction details from a set of current transactions being processed by a production version of a transaction processing service that is implemented on a production computer system;
using, by the evaluation computer system, the accessed transaction details to identify transactions of particular types;
selecting, by the evaluation computer system based on a particular product to be evaluated, a subset of the identified transactions;

performing, by the evaluation computer system in parallel with the processing of the set of current transactions by the production computer system, tests on the particular product using the transaction details of the subset; and storing, by the evaluation computer system, output from the tests performed using the transaction details.

2. The method of claim 1, wherein the particular product is software that is an evaluation version of the transaction processing service that is an update to the production version of the transaction processing service.

3. The method of claim 2, wherein performing the tests on the evaluation version of the transaction processing service includes evaluating a particular transaction of the subset of identified transactions to determine whether the particular transaction is valid; and wherein the method further comprises the evaluation computer system comparing a result for the particular transaction produced by the evaluation computer system to a result for the particular transaction produced by the production computer system.

4. The method of claim 2, further comprising:

tracking processing times for the subset of current identified transactions processed by the production version of the transaction processing service; and comparing the tracked processing times to processing times for the evaluation version of the transaction processing service during the performed tests.

5. The method of claim 1, wherein the particular product is hardware that is an updated version of the production computer system.

6. The method of claim 1, wherein processing the subset of identified transactions includes exchanging, by the production computer system, messages that include the transaction details, and wherein accessing the transaction details includes:

monitoring, by the evaluation computer system, the messages exchanged on the production computer system;

copying, by the evaluation computer system, the monitored messages to the evaluation computer system; and extracting, by the evaluation computer system, the transaction details from the copied messages.

7. The method of claim 1, wherein performing the tests on the particular product includes the evaluation computer system using, on average, ninety-five percent of the accessed transaction details within one second from receipt from the production computer system.

8. A non-transitory, computer-readable medium storing instructions that, when executed by an evaluation computer system, cause the evaluation computer system to perform operations comprising:

identifying a set of a plurality of current transactions being processed by a production version of a transaction processing service implemented on a production computer system;

determining transaction types for ones of the set of identified transactions;

based on a particular product to be evaluated, using the determined transaction types to select a subset of the identified transactions;

accessing transaction details from the subset of the identified transactions;

using, in real-time with the processing of the current transactions, the transaction details to generate test input data for evaluation tests performed on the particular product; and monitoring results from the evaluation tests that are performed using the transaction details.

9. The computer-readable medium of claim 8, wherein the particular product is a software product that is executing on the evaluation computer system, and wherein the generated test input data is an input to the evaluation tests.

10. The computer-readable medium of claim 9, wherein monitoring the results from the evaluation tests includes:

tracking a production result for a particular transaction of the subset of the identified transactions that is being processed on the production computer system; and comparing an evaluation result for the particular transaction produced by the software product to the production result for the particular transaction.

11. The computer-readable medium of claim 10, wherein comparing the evaluation result to the production result includes comparing a processing time for the production result to a processing time for the evaluation result.

12. The computer-readable medium of claim 8, wherein performing the evaluation tests on the particular product includes generating the test input data for a hardware product that is coupled to communicate with the evaluation computer system.

13. The computer-readable medium of claim 12, wherein the operations further comprise:

tracking an amount of time from when particular test input data that is based on a particular transaction of the subset of the identified transactions is sent to the hardware product to when an evaluation result based on the particular test input data is received from the hardware product; and comparing the amount of time to an elapsed time for completing the particular transaction on the production computer system.

14. The computer-readable medium of claim 8, wherein accessing the transaction details from the subset of the identified transactions includes snooping messages exchanged by the production computer system.

15. A system comprising:

a production computer system configured to:

process a plurality of current transactions between two or more entities that use a transaction processing service that is implemented on the production computer system; and access, while processing the plurality of current transactions, transaction details from a set of the plurality of current transactions; and an evaluation computer system configured to:

receive the transaction details from the set of the plurality of current transactions;

use the received transaction details to identify transactions of a particular type;

select, based on a particular product to be evaluated, a subset of the identified transactions;

use, while the production computer system is processing the plurality of current transactions, the transaction details of the subset, perform tests on the particular product under evaluation by the evaluation computer system; and monitor output from the tests performed using the transaction details.

16. The system of claim 15, wherein the evaluation computer system is configured to use accessed transaction details within three seconds of receipt from the production computer system in ninety-eight percent of cases.

17. The system of claim 15, wherein to perform the tests on the particular product, the evaluation computer system is configured to:

execute an evaluation version of a software product corresponding to the particular product; and apply, to the evaluation version of the software product, test input data that is based on the transaction details of the subset of the identified transactions.

18. The system of claim 17, wherein the production computer system is further configured to produce, using the transaction processing service, an approval decision for a particular transaction of the subset of the plurality of current transactions; and wherein the evaluation computer system is further configured to assert an indication that the evaluation version of the software product produced a decision that is different from the production computer system for the particular transaction.

19. The system of claim 15, wherein to perform the tests on the particular product, the evaluation computer system is configured to:

communicate with the particular product, wherein the particular product is an evaluation version of a hardware product, and the tests are performed to determine whether the evaluation version of the hardware product will be added to the production computer system; and send, to the evaluation version of the hardware product, test input data that is based on the transaction details.

20. The system of claim 19, wherein the production computer system is further configured to provide, to the evaluation computer system, a production result for a particular transaction of the subset of the identified transactions performed by the production computer system; and wherein the evaluation computer system is further configured to compare the production result to an evaluation result determined using the evaluation version of the hardware product.

* * * * *